United States Patent Office 3,198,645
Patented Aug. 3, 1965

3,198,645
FINELY DIVIDED NITROCELLULOSE PARTICLES AND MANUFACTURE AND USE THEREOF
Mark Plunguian, Newark, Del., assignor to Hercules Powder Company, Wilmington, Del., a corporation of Delaware
No Drawing. Filed Aug. 30, 1962, Ser. No. 220,535
16 Claims. (Cl. 106—170)

This invention relates to a novel and improved form of finely divided nitrocellulose and to the method of preparing it. The invention also relates to novel dispersions of said finely divided nitrocellulose and to the use of these dispersions in coating compositions, adhesives, inks and the like.

Nitrocellulose, a major film forming polymer employed in production of protective and decorative coatings, adhesives, inks, etc., has always been handicapped somewhat in that volatile organic solvent mixtures in substantial amounts have been required to dissolve the nitrocellulose, and films and coatings then are formed by evaporation of the solvent from a thin layer of the resulting solution. An alternate method, emulsification of the nitrocellulose lacquer solution, still requires substantial amounts of nitrocellulose solvents. These volatile solvents represent an important item of expense to the user of nitrocellulose, since in a great many applications the volatile solvents are of necessity lost by evaporation. Even in applications where solvent recovery is feasible, such solvent recovery is a substantial item of expense. In the interest of more economical formulation practice, therefore, there has been concerted effort over the years to find means whereby the solvent expense inherent in the use of nitrocellulose in protective coatings, adhesives, etc., can be substantially reduced, and numerous expedients have been proposed to accomplish this objective.

In one approach to this problem it has been proposed to produce particles of nitrocellulose in finely divided form, which are then dispersed, together with plasticizer, resin, etc., in a nonsolvent medium, such as water, or an organic liquid which is a nonsolvent for nitrocellulose, such as aliphatic or aromatic hydrocarbon to form dispersion type coating compositions. Coatings of such dispersions laid down on various substrata may be coalesced to continuous films by application of heat, or by the application of a solvent-type plasticizer, or a volatile solvent for the nitrocellulose. When water is employed as the nonsolvent dispersing medium, the resulting dispersion is termed a "hydrosol," and when an organic diluent is employed, the resulting dispersion is termed an "organosol."

Heretofore, however, manufacture of finely divided particles of nitrocellulose for use in such hydrosol or organosol compositions has been tedious and expensive, and in many instances particles produced also have been deficient for the production of suitably smooth coatings from dispersions of such particles. More specifically, it has been proposed to prepare finely divided nitrocellulose by spray drying a solution of the nitrocellulose. This results in a heterogeneous mixture of solid particles, hollow spheroids, and fine threads, the average particle size of which is from 15 to 30 microns, with maximum sizes ranging to as much as 180 microns. Such a product, when dispersed in water or an organic diluent, produces a wet pasty mass devoid of satisfactory flow properties, from which smooth homogeneous coatings cannot be prepared. An additional disadvantage is the relatively large amount of nitrocellulose solvent required to prepare the solution for spray drying and to be recovered.

It has also been proposed to prepare nitrocellulose in finely divided form by frictionally grinding water-wet nitrocellulose between differentially rotating grinding plates or discs, as in a colloid mill, or between the rolls of a differential two-roll mill. Heretofore, however, such frictional grinding has always resulted in a heterogeneous product of relatively large particle size from which forms only wet pasty masses devoid of satisfactory smoothness and flow characteristics when dispersed in a nonsolvent medium, and entirely unsuitable for the preparation of satisfactory dispersion type coating compositions.

It has also been proposed to prepare finely divided nitrocellulose particles by dissolving the nitrocellulose in suitable volatile solvent mixtures and then forming an emulsion or dispersion of droplets of the resulting nitrocellulose solution in water, after which the solvent is removed by various means such as spray drying, emulsion boil-off, flash evaporation, spraying into a steam atmosphere, etc., to precipitate the nitrocellulose in fine particle form. Although use of lacquer-in-water emulsions or suspensions generally produce more uniform particles, both with respect to size of particle and particle configuration, than spray drying of solution, the products produced thereby are generally still too large, and therefore somewhat deficient for production of smooth, homogeneous coatings from dispersions thereof, and a large majority of these methods of production still require relatively large amounts of nitrocellulose solvent to prepare the lacquer-in-water emulsions and to be recovered.

It is an object of this invention, therefore, to provide a novel and improved form of finely divided nitrocellulose particles which can be formulated into smooth, flowable, stable dispersions in a nonsolvent medium suitable for application to various substrata to form smooth homogeneous coatings thereon by fusion or by the application of a solvent-type plasticizer or volatile nitrocellulose solvent.

It is another object of this invention to provide an improved process for producing such finely divided nitrocellulose particles which is simple, economical, and reliable, and has economic and procedural advantages over prior art methods.

It is a further object of this invention to provide smooth, flowable, stable hydrosol and organosol dispersions containing a relatively high proportion by weight of the novel and improved form of finely divided nitrocellulose. Other objects will be apparent from the detailed description that follows.

In accordance with this invention, it has been discovered that fibrous nitrocellulose, obtained by nitrating natural cellulose fibers, can be comminuted to a particle size which is eminently suitable for the preparation of useful dispersions thereof in nonsolvent media. More particularly, the finely divided nitrocellulose particles of this invention have particle sizes of less than about 3 microns in at least one dimension, said particles being irregularly shaped fragments of fibrous nitrocellulose, obtained by nitrating natural cellulose fibers. These finely divided nitrocellulose particles are prepared, in accordance with this invention, by subjecting said fibrous nitrocellulose suspended in a nonsolvent medium of the group consisting of water, straight and branched chain alkanols having 1–4 carbon atoms, and mixtures thereof, to repeated crushing impacts until substantially all of the nitrocellulose fibers have been fractured and comminuted into fragments which have particle sizes of less than about 3 microns in at least one dimension.

Smooth, fluid dispersions of high nitrocellulose content, on the order of about 30–50% by weight, are prepared from the resulting slurry of finely comminuted particles of nitrocellulose in nonsolvent medium as follows:

When water or an aqueous mixture of water and alkanol is employed as the nonsolvent medium in which the nitrocellulose is comminuted, the resulting dispersion of finely divided nitrocellulose particles in said nonsolvent medium is concentrated by draining off excess nonsolvent grinding medium by filtration or equivalent means thereby producing a stiff, nonflowing filter cake of finely divided nitrocellulose particles moist with aqueous nonsolvent grinding medium, and containing from about 40% to about 50% by weight of nitrocellulose. This moist cake, upon incorporating thereinto a small and effective amount between about 0.5% and about 2% by weight of a hydrophilic protective colloid, based on weight of nitrocellulose, deflocculates to produce a smooth, fluid dispersion of the finely divided nitrocellulose particles in the nonsolvent medium present in the moist filter cake, which dispersion is stable with respect to freedom from any appreciable tendency for settling out of the nitrocellulose particles on standing; that is, the particles of nitrocellulose remain substantially uniformly suspended in the dispersion indefinitely.

When a substantially nonaqueous alkanol, such as n-butanol, for example, is employed as the nonsolvent medium in which the nitrocellulose is comminuted, smooth, fluid dispersions of high nitrocellulose content are readily prepared from the resulting slurry of finely comminuted particles of nitrocellulose in the nonaqueous alkanol, without having to use a deflocculating protective colloid, by concentrating said slurry by filtration, gravity or centrifugal settling with decantation of supernatant liquid, or equivalent means, to a viscous creamy consistency, and the particles of nitrocellulose remain substantially uniformly suspended in the resulting concentrated dispersion indefinitely with no further treatment.

This is most surprising and unexpected, for heretofore it was the general consensus and experience of those skilled in the art that irregular particles of fibrous nitrocellulose produced by frictional grinding or comminuting methods known in the art result only in wet pasty masses devoid of satisfactory smoothness and flow characteristics when dispersed in a nonsolvent medium. It is presently believed that the smooth fluid characteristics of the dispersions of this invention are due principally to the extremely fine particle size obtained by the novel comminuting method of this invention, and partly at least, in dispersions employing an aqueous medium, to the formation of a barrier of protective colloid around each of the tiny nitrocellulose particles which causes the particles to repel each other and, therefore, effectively prevents agglomeration of the comminuted nitrocellulose particles into undesirably larger aggregates.

The smooth, fluid dispersions of finely comminuted nitrocellulose particles obtained in accordance with this invention are readily formulated into satisfactory dispersion type coating compositions, adhesives, inks, and the like with conventional plasticizing agents, resins, coloring materials, and the like, as more fully described hereinafter.

The general nature of the invention having been set forth, the following examples are presented as representative embodiments thereof. It will be understood, however, that the invention is not limited to the examples, since this invention may be practiced by the use of various modifications and changes within the scope of the invention as herein described.

EXAMPLE 1

Eight hundred (800) grams, dry basis, of ethyl alcohol wetted fibrous nitrocellulose (1,140 grams, total weight) having a nitrogen content of 11% by weight and a standard ASTM 5/16 inch falling ball viscosity characteristic of 5–6 seconds in 12.2% by weight concentration in a solvent composed of 55% toluene, 25% denatured ethyl alcohol, and 20% ethyl acetate by weight at 25° C. were mixed with 2,860 grams of water to form an aqueous slurry containing 20% by weight of nitrocellulose, and the resulting slurry was ball-milled at 16 r.p.m. for 48 hours in a 6 gallon porcelain ball mill half filled with 3/4 inch corundum pebbles. This ball-milling treatment broke up the original fibers of nitrocellulose into tiny irregular fragments, approximately 95% of these tiny fragments having a particle size of 1 micron or less, with substantially no fragments larger than about 2 microns in size.

This ball-milled dispersion of comminuted nitrocellulose particles in aqueous medium was then diluted with additional water for removal from the ball mill and was concentrated by draining off excess aqueous medium on a vacuum filter to produce a stiff, nonflowing, moist filter cake of comminuted nitrocellulose particles. The moist filter cake was then thoroughly blended in a gallon-size Waring Blendor with 2% by weight, based on dry nitrocellulose weight, of powdered methyl cellulose having a methoxyl content of approximately 30% by weight and a viscosity of 15 centipoises measured on a 2% solution thereof in water at 20° C., thereby producing a smooth, homogeneous fluid hydrosol dispersion of the finely divided nitrocellulose particles in the nonsolvent aqueous liquid present in the moist filter cake, and containing 44% solids consisting of 98% by weight of nitrocellulose and 2% by weight of methyl cellulose. The particles of nitrocellulose remained substantially uniformly suspended in this dispersion indefinitely.

EXAMPLE 2

One thousand two hundred forty (1,240) grams, dry basis, of ethyl alcohol wetted fibrous nitrocellulose (1,777 grams, total weight) having a nitrogen content of 11% by weight and a standard ASTM 5/16 inch falling ball viscosity characteristic of 3–4 seconds in 20% by weight concentration in a solvent composed of 55% toluene, 25% denatured ethyl alcohol, and 20% ethyl acetate by weight at 25° C. were mixed with 1,773 grams of water to form an aqueous slurry containing approximately 35% by weight of nitrocellulose, and the resulting slurry was ball-milled at 16 r.p.m. for 21 hours in a 6 gallon porcelain ball mill half filled with 3/4 inch corundum pebbles. This ball-milling treatment broke up the original fibers of nitrocellulose into tiny irregular fragments, approximately 99% of these tiny fragments having a particle size of 1 micron or less, with substantially no fragments larger than about 2 microns in size.

This ball-milled dispersion of comminuted nitrocellulose particles in aqueous medium was then diluted with additional water for removal from the ball mill, and was concentrated by draining off excess aqueous medium on a vacuum filter to produce a stiff nonflowing, moist cake of comminuted nitrocellulose particles. The moist filter cake was then thoroughly blended in a gallon size Waring Blendor with 2% by weight, based on dry nitrocellulose weight, of powered methyl cellulose having a methoxyl content of approximately 30% by weight and a viscosity of 15 centipoises measured on a 2% solution thereof in water at 20° C., thereby producing a smooth, homogeneous fluid dispersion of finely divided nitrocellulose particles in the nonsolvent aqueous liquid present in the moist filter cake, and containing 40% solids consisting of 98% by weight of nitrocellulose and 2% by weight of methyl cellulose. The particles of nitrocellulose remained substantially uniformly suspended in this dispersion indefinitely.

EXAMPLE 3

Pigmented and unpigmented dispersion type hydrosol paper coating compositions were prepared from the fluid hydrosol dispersions of finely divided nitrocellulose particles described in Examples 1 and 2 by modifying these nitrocellulose dispersions with resin, wax and plasticizer emulsions, and pigment dispersion, prepared as follows:

*Resin emulsion*

One hundred thirty-eight (138) grams of a balsamic alkyl resin of terpinene maleic anhydride having an acid number of approximately 30 was mixed hot with 4.2 grams of a surface active agent consisting of the polyoxyethylene esters of mixed tall oil fatty and resin acids, and with 2.8 grams of oleic acid, and this mixture was emulsified by pouring the same with continuous vigorous agitation into 145 grams of an aqueous ammonia solution containing 10 grams of ammonium hydroxide to produce a resin emulsion containing 50% by weight of nonvolatile content.

*Wax emulsion*

One hundred ninety-six and six tenths (196.6) grams of refined paraffin wax having a melting point of 135–137° F. were melted and mixed hot with 5.9 grams of a surface active agent consisting of the polyoxyethylene esters of mixed tall oil fatty and resin acids, and with 2 grams of stearic acid. This mixture was poured with continuous vigorous agitation into 232 grams of hot water containing 0.4 gram of potassium hydroxide. The resulting emulsion was reheated, homogenized while hot by passing through a colloid mill, allowed to cool to room temperature without disturbance, and then was screened by passing through a U.S. Standard Sieve No. 60. The resulting wax emulsion contained 43.3% by weight of nonvolatile content.

*Plasticizer emulsion*

One hundred fifty (150) grams of dibutylphthalate were mixed with 3 grams of a surface active agent consisting of the polyoxyethylene esters of mixed tall oil fatty and resin acids. This mixture was poured with vigorous continuous agitation into 72 grams of water containing 0.36 gram of the sodium salt of dioctylsulfosuccinate to produce an emulsion containing 66.6% of dibutylphthalate.

*Pigment dispersion*

Sixteen and eight-tenths (16.8) grams of pigment grade carbon black were dispersed in 147.8 grams of water containing 3.4 grams of methyl cellulose having a methoxyl content of approximately 30% by weight and a viscosity of 15 centipoises measured on a 2% solution thereof in water at 20° C., and was ball-milled in a one-quart porcelain ball mill at 50 r.p.m. for 16 hours to produce a dispersion containing 10% carbon black.

Table I following shows the composition of the disperse type hydrosol paper coating compositions prepared from the above described dispersions and emulsions by mixing together with vigorous agitation the proportions of each shown in the table.

TABLE I

| Ingredients | Unpigmented Hydrosol Paper Coating Composition | | Pigmented Hydrosol Paper Coating Composition | |
|---|---|---|---|---|
| | Total Weight (Wet Basis) Parts by Wt. | Nonvolatiles (Dry Basis) Parts by Wt. | Total Weight (Wet Basis) Parts by Wt. | Nonvolatiles (Dry Basis) Parts by Wt. |
| Fluid Hydrosol Dispersion of Nitrocellulose Particles Example 1 | 116 | 51 | | |
| Fluid Hydrosol Dispersion of Nitrocellulose Particles Example 2 | | | 191 | 76.5 |
| Resin Emulsion | 46 | 23 | 69 | 34.5 |
| Wax Emulsion | 7 | 3 | 10.5 | 4.5 |
| Plasticizer Emulsion | 33.8 | 23 | 50.7 | 34.5 |
| Pigment Dispersion | | | 45.0 | 4.5 |
| Water (additional) | 30.2 | | | |
| Total Weight | 232 | 100 | 386.2 | 154.5 |
| Percent Nonvolatile | 43 | | 40 | |

The disperse hydrosol compositions set forth in Table I above were smooth, uniform, nonthixotropic fluid systems which were substantially stable with respect to freedom from any appreciable tendency for settling out of dispersed particles. These dispersions were coated on paper with an air knife coater. The coated papers were dried and fused under heating lamps and were then hot calendered at 190° F.–210° F. Smooth glossy coatings were obtained which were grease resistant, waterproof, and which had low moisture vapor transmission rates. These coatings exhibited good heat sealing characteristics.

EXAMPLE 4

One hundred (100) grams, dry basis, of ethyl alcohol wetted fibrous nitrocellulose (143 grams, total weight) having a nitrogen content of 12% by weight and a standard ASTM 5/16 inch falling ball viscosity characteristic of 3–4 seconds in 20% by weight concentration in a solvent composed of 55% toluene, 25% denatured ethyl alcohol, and 20% ethyl acetate by weight at 25° C. were mixed with sufficient water to form an aqueous slurry containing 20% by weight of nitrocellulose, and the resulting slurry was ball-milled at 28 r.p.m. for 39 hours in a one-gallon porcelain ball mill half filled with ¾ inch corundum pebbles. This ball-milling treatment broke up the original fibers of nitrocellulose to produce a very uniform distribution of tiny irregular particles of about 1 micron in size with substantially no particles larger than about 2 microns.

This ball-milled dispersion of comminuted nitrocellulose particles in aqueous medium was washed from the mill with additional water onto a vacuum filter where excess aqueous medium was drained off to produce a stiff, nonflowing filter cake of comminuted nitrocellulose particles moist with about 50% by weight, based on filter cake weight, of aqueous medium. The moist filter cake was then deflocculated by thoroughly blending thereinto 2% by weight, based on dry nitrocellulose weight, of powdered methyl cellulose having a methoxyl content of approximately 30% by weight and a viscosity of 15 centipoises measured on a 2% solution thereof in water at 20° C., thereby producing a smooth, homogeneous fluid dispersion of finely divided nitrocellulose particles in the nonsolvent aqueous liquid present in the moist filter cake, and containing 49% solids consisting of 98% by weight of nitrocellulose and 2% by weight of water soluble methylcellulose. The particles of nitrocellulose remained substantially uniformly suspended in this dispersion indefinitely.

This dispersion was employed to prepare disperse type hydrosol paper coating compositions, as set forth in Example 3 and having substantially the same properties and characteristics as the hydrosol paper coating compositions described in Example 3.

EXAMPLES 5–10

A series of smooth, stable, homogeneous fluid dispersions of finely divided nitrocellulose particles in nonsolvent aqueous medium was prepared following the procedure described in Example 4, with the exception that a different hydrophilic protective colloid in an amount equal to 2% by weight, based on dry nitrocellulose weight, was employed for each dispersion prepared. These protective colloids, with the exception of ammonium caseinate, were in the form of fine granular or powders. The ammonium caseinate was prepared as follows:

Twenty (20) grams of Montreal casein was soaked in 80 grams of water for 5 minutes. Then 1.2 grams of concentrated ammonium hydroxide was added and the mixture was heated to 50° C. with stirring, and held at 50° C. with agitation until the casein was dissolved, about 15 minutes. Then 2 grams of a 20% by weight solution of sodium pentachlorophenate in water was added to the casein solution as a preservative.

Table II following identifies the protective colloids employed in this series:

TABLE II

| Example No. | Protective Colloid Employed | |
|---|---|---|
| | Amount (by wt.), Percent | Identity |
| 5 | 2 | Hydroxypropyl cellulose. |
| 6 | 2 | Hydroxypropyl methyl cellulose. |
| 7 | 1 2 | Ammonium caseinate. |
| 8 | 2 | Hydroxyethyl cellulose. |
| 9 | 2 | Sodium naphthalenesulfonate. |
| 10 | 2 | Sodium lignosulfonate. |

[1] Dry weight.

These dispersions were employed to prepare disperse type hydrosol paper coating compositions, as set forth in Example 3, and having substantially the same properties and characteristics as the hydrosol paper coating compositions described in Example 3.

EXAMPLE 11

Twenty-four and one-tenth (24.1) pounds, dry basis, of water wet fibrous nitrocellulose having a nitrogen content of 12% by weight and a standard ASTM 5/16 inch falling ball viscosity characteristic of 5–6 seconds in 12.2% by weight concentration in a solvent composed of 55% toluene, 25% denatured ethyl alcohol, and 20% ethyl acetate by weight at 25° C. were mixed with sufficient additional water to form a slurry containing 25.3% by weight of nitrocellulose. To this slurry was added the following rust-inhibiting materials:

70 grams sodium nitrite
3.5 grams polysodium hexametaphosphate
50 grams sodium benzoate
10 grams trisodium phosphate The slurry was charged to a steel ball mill of 30 inch diameter and 24 inch length, of 73 gallon capacity, containing 921 pounds of steel balls of mixed one-quarter inch and three-eighths inch diameter (equal number of each size), having a bulk volume of 23.6 gallons and 9.4 gallons equivalent voids or interstices between the balls. The charged mill was rotated for 15 hours at 44 r.p.m. while circulating a slow stream of nitrogen through the mill. Samples were taken from time to time during the run for microscopic examination, and the following tabulation shows the approximate diameter of only the coarsest particles in each of these samples.

| Duration of Ball-Milling When Sample Was Taken, Hours | Approximate Diameter of the largest Particles, Microns |
|---|---|
| 2 | 700–800 |
| 3.5 | 300 |
| 5 | 75 |
| 8 | 15 |
| 10.5 | 10 |
| 12.5 | 5 |
| 15 | 3 |

Examination showed that after 15 hours of ball-milling most of the particles of nitrocellulose were tiny irregular fragments of 1 micron or less in size, with a very small percentage up to about 3 microns in size.

This ball-milled dispersion of comminuted nitrocellulose particles was washed from the mill with additional water onto a vacuum filter, and was concentrated by draining off excess aqueous medium to produce a stiff, nonflowing filter cake of comminuted nitrocellulose particles moist with about 50% by weight, based on filter cake weight, of water. The moist filter cake was then thoroughly blended with 2% by weight, based on dry nitrocellulose weight, of powdered methyl cellulose having a methoxyl content of approximately 30% by weight and a viscosity of 15 centipoises measured on a 2% solution thereof in water at 20° C., thereby producing a smooth, homogeneous fluid dispersion of finely divided nitrocellulose particles in the nonsolvent aqueous liquid present in the moist filter cake, and containing 49% solids consisting of 98% by weight of nitrocellulose and 2% by weight of methyl cellulose. This dispersion was stable with respect to freedom from any appreciable tendency for settling out of the dispersed nitrocellulose particles.

EXAMPLE 12

The above fluid hydrosol dispersion of finely divided nitrocellulose particles of Example 11 was employed to prepare dispersion type hydrosol paper coating compositions by modifying it with the plasticizer emulsion described in Example 3 and with an emulsion (described below) containing a blend of a hard, high melting alkyd resin with additional plasticizer. The use of the hard, high melting alkyd resin and additional plasticizer in these compositions required additional hydrophilic protective colloid to stabilize the dispersions and prevent softening and agglomeration of the dispersed nitrocellulose particles.

*Emulsion of blend of hard, high melting alkyd resin and plasticizer*

Seventy-two (72) grams of a hard, rosin-derived alkyd resin having an acid number of approximately 10 and a softening point of 85–93° C., 28 grams of dibutylphthalate, 3 grams of oleic acid and 2 grams of a surface active agent consisting of the polyoxyethylene esters of mixed tall oil fatty and resin acids were heated and blended together to a temperature of 95° C. with mixing, and then 95 grams of a water solution, containing 0.9 gram of ammonium hydroxide, preheated to approximately 85° C., was added to the melted resin-plasticizer blend with vigorous agitation to effect emulsification. Additional water was added to make up for loss by evaporation to a total of 200 grams.

Table III following shows the composition of the disperse type paper coating compositions obtained by mixing together with vigorous agitation the proportions of ingredients shown in the table.

TABLE III

| Ingredients | Hydrosol Paper Coating Composition A | | Hydrosol Paper Coating Composition B | |
|---|---|---|---|---|
| | Total Weight (Wet Basis) Parts by Wt. | Nonvolatiles (Dry Basis) Parts by Wt. | Total Weight (Wet Basis) Parts by Wt. | Nonvolatiles (Dry Basis) Parts by Wt. |
| Fluid Hydrosol Dispersion of Nitrocellulose Particles Example 11 | 43 | 21.1 | 43 | 21.1 |
| Emulsion of Blend of Hard High Melting Alkyd Resin and Plasticizer | 36.8 | 18.4 | 36.8 | 18.4 |
| Plasticizer Emulsion, Example 3 | 15.6 | 10.4 | 15.6 | 10.4 |
| Ammonium Caseinate, Example 7 | 6.7 | 1.4 | | |
| Water Solution Containing 7.6% by Weight of Hydroxypropyl Cellulose | | | 17 | 1.4 |
| Water (additional) | 34 | | 23.7 | |
| Total Weight | 136.1 | 51.3 | 136.1 | 51.3 |
| Percent Nonvolatile | 37.7 | | 37.7 | |

The disperse hydrosol Compositions A and B in Table III above were smooth, uniform, nonthixotropic fluid systems which were substantially stable with respect to freedom from any appreciable tendency for settling out of dispersed particles. These compositions were coated on paper with a trailing blade coating machine, and the applied coatings were dried and fused at 105° C. Compositions A and B were then further modified by adding to each an amount of the paraffin wax emulsion described in Example 3 equivalent to 3% by weight of paraffin wax, based on the nonvolatile components in Compositions A and B. The reformulated dispersions were then used to apply a second coating over the first-applied coating by means of the trailing blade coating machine. The applied coatings were then heated to 105° C. to dry and fuse them, after which the coated papers were supercalendered at 170° F. Smooth glossy coatings were obtained which were greaseproof, waterproof, and which had low moisture vapor transmission rates. These coatings also exhibited good heat sealing characteristics.

A series of hydrosol paper coating compositions similar to Compositions A and B in Table III were prepared which differed from Compositions A and B only in that a different hydrophilic protective colloid was employed in each composition prepared as the auxiliary stabilizing protective colloid in place of the ammonium caseinate in Composition A or the hydroxypropyl cellulose in Composition B. The amount of stabilizing protective colloid in each composition was 2% by weight, based on nonvolatile content. The following tabulation identifies the protective colloids employed in this series:

Composition C—Sodium carboxymethyl cellulose
Composition D—Sodium carboxymethyl hydroxyethyl cellulose
Composition E—Sodium carboxymethyl starch
Composition F—Hydroxyethyl cellulose
Composition G—Hydroxypropyl methyl cellulose
Composition H—Hydroxypropyl starch Compositions C–H, inclusive, exhibited substantially the same properties as Compositions A and B, and produced coatings on paper with the same properties as Compositions A and B initially, and as modified with the paraffin wax emulsion of Example 3.

EXAMPLE 13

Forty (40) grams of dry basis nitrocellulose having a nitrogen content of 12% by weight and a standard ASTM $5/_{16}$ inch falling ball viscosity characteristic of 3–4 seconds in 20% by weight concentration in a solvent composed of 55% toluene, 25% denatured ethyl alcohol, and 20% ethyl acetate by weight at 25° C. was suspended in 160 grams of n-butanol, and the resulting slurry was ball-milled at 50 r.p.m. for 89 hours in a one-quart porcelain ball mill half filled with ¾ inch corundum pebbles to produce a very uniform distribution of tiny irregular nitrocellulose fragments of about 1 micron in size with substantially no fragments larger than about 3 microns. The resulting slurry of finely comminuted nitrocellulose particles in n-butanol, upon recovery from the ball mill, was allowed to stand undisturbed, whereupon the comminuted nitrocellulose particles settled, and the supernatant layer of n-butanol was decanted, leaving a smooth, homogeneous, very viscous thixotropic fluid dispersion of finely comminuted nitrocellulose particles in n-butanol containing 28% by weight of nitrocellulose. The particles of nitrocellulose remained substantially uniformly suspended in this dispersion indefinitely.

Twenty-four (24) grams of the above organosol dispersion of finely comminuted nitrocellulose particles in n-butanol were mixed with 24 grams of a 28% by weight solution in n-butanol of a pale, hard, modified pentaerythritol ester of rosin having a softening point of 131–137° C. and an acid number of 30–40, and diluted to 23.2% total solids with n-butanol. The thus diluted dispersion was sprayed on both steel and maplewood panels, allowed to dry in the air, and the dried coatings were then sprayed with a mist of butyl acetate until uniformly wetted thereby. Upon drying, clear continuous adherent films were obtained. Other base coats similarly obtained by spraying of the above organosol dispersion of nitrocellulose particles modified with resin on steel and maplewood panels and drying were then sprayed with a 15% by weight solution of dibutylphthalate in butyl acetate to give plasticized, tough films upon drying.

EXAMPLE 14

Water wet fibrous nitrocellulose having a nitrogen content of 12% by weight and a standard ASTM $5/_{16}$ inch falling ball viscosity characteristic of 5–6 seconds in 12.2% by weight concentration in a solvent composed of 55% toluene, 25% denatured ethyl alcohol and 20% ethyl acetate by weight at 25° C. was comminuted substantially as described in Example 11, and the ball-milled dispersion of comminuted nitrocellulose particles in water was washed from the mill with additional water onto a vacuum filter where excess water was drained off to produce a stiff, nonflowing filter cake of comminuted nitrocellulose particles moist with about 52.5% by weight, based on filter cake weight, of water.

One hundred (100) parts by weight of this moist filter cake, containing about 47.5% by weight of comminuted nitrocellulose particles, were mixed with 35.8 parts by weight of additional water and with 34 parts by weight of a hot aqueous starch solution containing 11 parts by weight of starch to produce an aqueous slurry containing 35% by weight total solids, and having a Brookfield viscosity of 410 centipoises at 25° C.

Some specimens of paper were single coated with the above aqueous slurry of nitrocellulose particles containing starch, and other specimens of paper were double coated therewith, employing an air-knife coater, and the coated papers were dried in air. Some specimens each of the thus single coated and double coated paper were then further coated by means of a trailing blade coater with dibutylphthalate, whereupon they were supercalendered at 190° F.–210° F. to produce smooth continuous uniform coatings on paper, which were grease resistant and moisture vapor transmission resistant. Similar results were obtained with other similar paper specimens coated with the above aqueous slurry of nitrocellulose particles containing starch, dried, and then further coated with dioctylphthalate and supercalendered.

Other specimens of paper coated with the above aqueous slurry of nitrocellulose particles containing starch, and dried, were further coated by means of a trailing blade coater with a hot solution at 90° C. containing 66% by weight of a hard, rosin-derived alkyd resin having an acid number of approximately 10 and a softening point of 70–76° C. dissolved in 34% by weight of dibutylphthalate. These coated papers were then sprayed with butylacetate until the coated surfaces were uniformly wet with butyl acetate. Upon drying, highly glossy coatings were obtained which were flexible, had good strength, and gave good grease and moisture resistance to the coated papers.

In another embodiment of the invention, an amount of the above aqueous slurry of nitrocellulose particles containing starch was mixed with an equal amount by weight of an aqueous dispersion of carbon black containing 20% by weight of carbon black, and the resulting pigmented composition was applied as a printing ink on paper, air dried, sprayed with butyl acetate and again air dried to produce a glossy black adherent print.

In a further embodiment of the invention, the aqueous slurry of nitrocellulose particles containing starch was coated on two wood surfaces, and also on two paper surfaces and air dried. The coated wood and paper surfaces were then sprayed with acetone, dried briefly until just tacky, and the coated wood and paper surfaces were pressed together until completely dry to produce permanent bonds of wood to wood and paper to paper, respectively.

EXAMPLE 15

To a portion of the hydrosol dispersion of finely comminuted nitrocellulose particles of Example 11, containing 49% solids consisting of 98% by weight of nitrocellulose and 2% by weight of methyl cellulose, was added 3% by weight, based on nitrocellulose content, of sodium carboxymethylcellulose, having a carboxymethyl substitution of 0.7 carboxymethyl substituent per anhydroglucose unit in the cellulose and a viscosity characteristic of 25–50 centipoises in 2% concentration by weight in water at 25° C., dissolved in sufficient water to form a 7.5% solution thereof. Example 14 was then repeated, with the exception that the above hydrosol dispersion of finely divided nitrocellulose particles, containing 2% by weight of methyl cellulose and further modified with an additional 3% by weight of sodium carboxymethylcellulose, based on nitrocellulose, was employed in place of the aqueous slurry of nitrocellulose particles containing starch, as set forth in Example 14, with substantially similar results to those described in Example 14.

The finely divided nitrocellulose particles of this invention can be produced from any fibrous nitrocellulose, obtained by nitrating natural cellulose fibers, such as cotton, purified cotton linters, purified wood pulp, and the like, in such forms as picked linters, shredded wood pulp, fluffed bulk fibers, finely ground or cut fibers, cubed or granulated fiber aggregates, and the like. In short, substantially any of the commercial types and grades of microfibrous nitrocellulose is suitable for the purposes of this invention, having nitrogen contents from about 10.9% to about 13.5% nitrogen, and viscosity characteristics from 10 centipoise type to 1,000 second type.

Satisfactory comminution of the nitrocellulose fibers requires the use, as a slurry medium for the fibrous nitrocellulose in the comminuting process, of a polar liquid which is a nonsolvent for nitrocellulose, and which is selected from the class consisting of water, straight and branched chain alkanols having 1–4 carbon atoms, and mixtures of water and one or more of said alkanols in any proportion. Suitable alkanols, therefore, include methanol, ethanol, n-propanol, isopropanol, n-butanol, isobutanol, secondary butanol and tertiary butanol. Water, or water containing up to about 25% by weight of a water-soluble alkanol, such as ethanol or isopropanol, based on dry nitrocellulose weight, are presently preferred as the nonsolvent slurrying medium for the fibrous nitrocellulose in the comminuting process of this invention, since these generally lead to satisfactory comminution of the nitrocellulose in a shorter period of time.

A further necessary feature of this invention is that the fibrous nitrocellulose suspended in a nonsolvent slurrying medium of this invention must be subjected to repeated forceful crushing impacts to fracture the nitrocellulose fibers into suitable small fragments, and any conventional device capable of delivering such crushing impacts is suitable for the purposes of this invention, such as, for example, ball mills, hammer mills, levigators, and the like. Ball-milling the slurry of the fibrous nitrocellulose has proven to be eminently satisfactory for accomplishing the necessary repeated crushing impacts to fracture the nitrocellulose fibers into suitable small fragments. In general the larger the ball mill is, the shorter is the time of ball-milling to accomplish the desired comminution, and the progress of the comminution can be effectively followed and controlled by taking samples at intervals during the comminution for microscopic measurement of fragment sizes. When the mill and/or balls are of a corrodible nature, as for example, a steel mill and/or steel balls, it is highly desirable to incorporate conventional corrosion inhibitors, such as sodium nitrite, polysodium hexametaphosphate, sodium benzoate, trisodium phosphate, and the like, into the comminuting slurry to inhibit corrosion. It is also desirable to employ an inert atmosphere, such as nitrogen, in the free space in the mill.

It has been found that frictional grinding action, such as is obtained in a differential two-roll mill, or between differentially rotating grinding plates or discs does not fracture the nitrocellulose fibers into tiny fragments suitable for the purposes of this invention.

From an economic standpoint, it is desirable to practice the comminution process of this invention with slurries containing as much fibrous nitrocellulose as practicable, and the upper practical limit for the amount of nitrocellulose in the slurry is governed by the ability to agitate the slurry effectively. For example, when a ball mill is employed for comminuting the nitrocellulose fibers, the slurry should be sufficiently fluid so that the balls can fall effectively to deliver the necessary crushing impacts on the nitrocellulose fibers. Generally, slurries containing between about 20% and about 35% by weight of fibrous nitrocellulose have been employed. Slurries containing less than about 20% of nitrocellulose fibers can be employed, but there is no advantage to be gained thereby. Furthermore, the invention is not limited to a maximum of 35% by weight of nitrocellulose in the slurry, since the upper practical limit is governed only by the ability to agitate the slurry effectively. Generally, the shorter the fibers of nitrocellulose are, the greater is the amount of nitrocellulose which can be incorporated into the comminuting slurry.

Comminution by subjecting the nitrocellulose fibers to repeated crushing impacts is carried out until microscopic examination of a representative sample of the slurry shows that substantially all of the nitrocellulose fibers have been fractured into tiny irregular fragments, a substantial majority, on the order of 95–99% or more, of which have a distribution of particle sizes in the range from sub-micron up to about 1–2 microns in all three dimensions, with no fragments larger than about 3 microns in at least one dimension. It will be evident that the time required to accomplish this degree of comminution will vary, depending on such factors as the particular fibrous nitrocellulose employed, the particular slurrying medium selected, the particular device employed to comminute the nitrocellulose fibers, etc. Hence, the practical method for following the course of the comminution is to take representative samples of the nitrocellulose slurry at intervals during the comminution, and examine the same microscopically to determine the degree of comminution obtained.

Microscopic examination may show a small percentage, generally less than about 5%, of tiny needle-like fragments which are less than 3 microns in two dimensions, but greater than 3 microns in length. These do not interfere in any way with the suitability of the comminuted nitrocellulose for the purposes of this invention. It has also been observed microscopically that when fibrous nitrocellulose is ball-milled with large metal spheres, such as one-inch steel balls, that some of the comminuted material may be in the form of irregular platelets about 2–3 microns in thickness, but more than 3 microns in diameter. These platelets appear to be full of cracks, and can be broken up by passage through a homogenizer. It appears that these platelets are aggregates of finely comminuted particles of nitrocellulose held together by some physical attraction or force. However, the presence of comminuted nitrocellulose particles in this platelet form does not interfere in any way with the suitability of the comminuted nitrocellulose for the purposes of this invention. Moreover, it has been observed microscopically that a small percentage of the finely comminuted fragments of nitrocellulose may aggregate to form particles on the order of about 15 microns during standing or during concentrating to higher solids. The presence of these relatively small aggregates in minor amount does not interfere with the suitability of the comminuted nitrocellulose for the purposes of this invention, since they appear to be substantially broken down when the hydrosol or organosol compositions of this invention are applied as coatings.

It has been found that any substance which has solvent, swelling, or softening action on the fibrous nitrocellulose, such as nitrocellulose solvents, plasticizers, resins, and the like, interferes with suitable comminution of the fibrous nitrocellulose, and must be avoided as components of the nitrocellulose slurrying medium in the comminuting process. Such materials, even in small amounts, appear to alter nitrocellulose crystallites, making them tougher and greatly more resistant to fracture so that satisfactory comminution of the nitrocellulose fibers cannot be obtained even after long periods of comminution. For example, comminution of nitrocellulose by ball-milling a 20% by weight slurry of RS ½ second type fibrous nitrocellulose in water containing 14.8% by weight of acetone did not produce particles below about 8 microns even after ball-milling for three days. It has also been found that the best comminuting action is obtained in the absence of surface active substances. Moreover, fibrous nitrocellulose suspended in nonpolar organic liquids such as aliphatic, cycloaliphatic, or aromatic hydrocarbons have not been satisfactorily comminuted to a sufficiently fine particle size for the purposes of this invention.

In preferred embodiments of the invention the slurry of comminuted nitrocellulose particles in nonsolvent medium, upon completion of the comminution process, is then concentrated to a higher nitrocellulose content than is present in the comminuting slurry by removing excess nonsolvent medium by such means, for example, as gravity or vacuum filtration, settling by gravity or centrifugal force followed by decantation of supernatant liquid, and the like.

When the nonsolvent slurrying medium is water, or a mixture of water and an alkanol, this concentration generally produces a stiff, nonflowing cake of finely divided nitrocellulose particles moist with the aqueous nonsolvent medium, and containing from about 40% to about 50% by weight of nitrocellulose. The moist cake of finely divided nitrocellulose particles is readily converted into a smooth, fluid dispersion of the finely divided nitrocellulose particles in the nonsolvent aqueous medium present in the moist cake by uniformly incorporating into the moist cake a small amount between about 0.5% and about 2% by weight of a hydrophilic protective colloid, based on weight of nitrocellulose, and sufficient to deflocculate the nitrocellulose particles.

The hydrophilic protective colloid can be added either in dry powdered or granulated form, or as a water solution thereof. It is presently preferred to add the protective colloid in dry form, since in this way dispersions containing a higher concentration of nitrocellulose are obtained. Amounts of hydrophilic protective colloid less than about 0.5% by weight, based on the nitrocellulose, are generally insufficient to effect efficient deflocculation of the nitrocellulose particles. Amounts of hydrophilic protective colloid appreciably greater than 2%, although effective for deflocculation, generally lead to excessive undesirable viscosity build-up in the resulting dispersion. This is because a majority of these hydrophilic protective colloids are polymeric in nature, and the viscosity of solutions thereof increases as a power function of the concentration. Accordingly, it is desirable, although not necessary, to employ no more hydrophilic protective colloid than is consistent with the ability of the colloid to effectively deflocculate the nitrocellulose particles.

Substantially any hydrophilic protective colloid which is capable of deflocculating the nitrocellulose particles is suitable for the purposes of this invention. Typical hydrophilic protective colloids include, by way of example, but not in limitation of the invention, water soluble alkyl ethers of cellulose, hydroxyalkyl ethers of cellulose, mixed alkyl hydroxyalkyl ethers of cellulose, such as methyl cellulose, ethyl cellulose, hydroxyethyl cellulose, hydroxypropyl cellulose, hydroxyisopropyl cellulose, methyl hydroxyethyl cellulose, methylhydroxypropyl cellulose, ethylhydroxyethyl cellulose, ethylhydroxypropyl cellulose, and the like; water soluble alkyl ethers of starch, hydroxyalkyl ethers of starch, mixed alkyl hydroxyalkyl ethers of starch, such as methyl starch, ethyl starch, hydroxyethyl starch, hydroxypropyl starch, hydroxyisopropyl starch, methylhydroxyethyl starch, methylhydroxypropyl starch, ethylhydroxyethyl starch, ethylhydroxypropyl starch, and the like; alkali metal and ammonium salts of casein, such as ammonium caseinate, sodium caseinate, potassium caseinate, lithium caseinate, rubidium caseinate, cesium caseinate; alkali metal and ammonium salts of lignosulfonic acid; alkali metal and ammonium salts of naphthalene sulfonic acid; alkali metal and ammonium salts of glucuronic, galacturonic, mannuronic, and related acid structures present in various vegetable mucilages, pectins and gums, and the like; polyoxyalkylene glycols, such as polyoxyethylene glycol, polyoxypropylene glycol, and the like; adducts of ethylene oxide and nonyl phenol, etc.

The preparation of smooth, fluid, stable dispersions of finely comminuted nitrocellulose particles in a substantially nonaqueous alkanol has been described hereinbefore, and requires no further description at this point.

The principal advantage of the finely comminuted nitrocellulose hydrosol and organosol dispersions of this invention resides in the fact that such dispersions can be utilized to produce disperse type coating compositions of high solids content without the use of any volatile nitrocellulose solvent. The examples illustrate application of these dispersions in preparing some typical disperse type coating compositions. The utility of the invention, however, is not limited to these illustrative examples, since it is evident that the nitrocellulose dispersions of this invention can be modified at will with suitable emulsions, dispersions, and the like, of any of the host of conventional resins, plasticizers, softeners, pigments, fillers, waxes, and the like, in any desired combination of such modifying adjuvants, and in any desired proportion thereof, to prepare dispersion type compositions for any purpose, such as for example, protective and decorative coatings for various metals, wood, paper, glass, leather, etc., adhesives for bonding various materials together, inks, and the like. It is apparent from the foregoing description that this invention accomplishes the objectives sought to be accomplished, and provides a new and unique form of finely divided nitrocellulose and dispersion compositions thereof having important advantages over previously known forms and compositions of finely divided nitrocellulose particles.

What I claim and desire to protect by Letters Patent is:

1. Finely divided irregularly shaped fragments of nitrocellulose fibers, a substantial majority of said fragments having a maximum dimension of about 2 microns, the remainder of said fragments being tiny, irregular, needle-like fragments less than 3 microns in two dimensions but greater than 3 microns in length and tiny irregular platelets less than 3 microns in thickness but more than 3 microns in diameter, said nitrocellulose fibers being nitrated natural cellulose fibers.

2. The process of preparing finely divided irregularly shaped fragments of nitrocellulose fibers which comprises subjecting nitrocellulose fibers suspended in a nonsolvent medium of the group consisting of water, straight and branched chain alkanols having 1–4 carbon atoms, and mixtures thereof, to repeated crushing impacts until substantially all of the nitrocellulose fibers have been fractured and comminuted into irregularly shaped fragments, a substantial majority of which have a maximum dimension of about 2 microns, the remainder being tiny, irregular, needle-like fragments less than 3 microns in two dimensions but greater than 3 microns in length and tiny irregular platelets less than 3 microns in thickness but more than 3 microns in diameter, said nitrocellulose fibers being nitrated natural cellulose fibers.

3. The process of preparing finely divided irregularly shaped fragments of nitrocellulose fibers which comprises ball-milling a slurry consisting essentially of nitrocellulose fibers suspended in a nonsolvent medium selected from the class consisting of water, straight and branched chain alkanols having 1–4 carbon atoms, and mixtures thereof, until substantially all of the nitrocellulose fibers have been fractured and comminuted into irregularly shaped fragments, a substantial majority of which have a maximum dimension of about 2 microns, the remainder being tiny, irregular, needle-like fragments less than 3 microns in two dimensions but greater than 3 microns in length and tiny irregular platelets less than 3 microns in thickness but more than 3 microns in diameter, said nitrocellulose fibers being nitrated natural cellulose fibers.

4. The process in accordance with claim 3 in which said nonsolvent medium is water.

5. The process in accordance with claim 3 in which said nonsolvent medium is an aqueous alkanol mixture.

6. The process in accordance with claim 5 in which said nonsolvent medium is an aqueous ethanol mixture.

7. The process in accordance with claim 3 in which said nonsolvent medium is an alkanol having 1-4 carbon atoms.

8. The process in accordance with claim 7 in which said nonsolvent medium is n-butanol.

9. A composition of matter comprising a smooth, fluid, homogeneous dispersion of tiny irregular fragments of nitrocellulose fibers in a nonsolvent dispersion medium selected from the class consisting of water, straight and branched chain alkanols having from 1–4 carbon atoms, and mixtures thereof in any proportion, a substantial majority of said fragments having a maximum dimension of about 2 microns, the remainder of said fragments being tiny, irregular, needle-like fragments less than 3 microns in two dimensions but greater than 3 microns in length and tiny irregular platelets less than 3 microns in thickness but more than 3 microns in diameter, said nitrocellulose fibers being nitrated natural cellulose fibers.

10. A composition of matter comprising a smooth, fluid, homogeneous dispersion of tiny irregular fragments of nitrocellulose fibers in water containing from about 0.5% to about 2% by weight, based on said nitrocellulose, of a hydrophilic protective colloid, a substantial majority of said fragments having a maximum dimension of about 2 microns, the remainder of said fragments being tiny, irregular, needle-like fragments less than 3 microns in two dimensions but greater than 3 microns in length and tiny irregular platelets less than 3 microns in thickness but more than 3 microns in diameter, said nitrocellulose fibers being nitrated natural cellulose fibers.

11. A composition of matter in accordance with claim 10 in which said hydrophilic protective colloid is methyl cellulose.

12. A composition of matter comprising a smooth, fluid, homogeneous dispersion of tiny irregular fragments of nitrocellulose fibers in an aqueous ethanol mixture containing from about 0.5% to about 2% by weight, based on said nitrocellulose, of a hydrophilic protective colloid, a substantial majority of said fragments having a maximum dimension of about 2 microns, the remainder of said fragments being tiny, irregular, needle-like fragments less than 3 microns in two dimensions but greater than 3 microns in length and tiny irregular platelets less than 3 microns in thickness but more than 3 microns in diameter, said nitrocellulose fibers being nitrated natural cellulose fibers.

13. A composition of matter in accordance with claim 12 in which said hydrophilic protective colloid is methyl cellulose.

14. A composition of matter comprising a smooth, fluid, homogeneous dispersion of tiny irregular fragments of nitrocellulose fibers in n-butanol, a substantial majority of said fragments having a maximum dimension of about 2 microns, the remainder of said fragments being tiny, irregular, needle-like fragments less than 3 microns in two dimensions but greater than 3 microns in length and tiny irregular platelets less than 3 microns in thickness but more than 3 microns in diameter, said nitrocellulose fibers being nitrated natural cellulose fibers.

15. The process in accordance with claim 3 which comprises
  (a) ball-milling a slurry consisting essentially of alcohol-dehydrated nitrocellulose fibers suspended in water until substantially all of said nitrocellulose fibers have been fractured and comminuted into irregularly shaped fragments, a substantial majority of which have a maximum dimension of about 2 microns, the remainder being tiny, irregular, needle-like fragments less than 3 microns in two dimensions but greater than 3 microns in length and tiny irregular platelets less than 3 microns in thickness but greater than 3 microns in diameter, said nitrocellulose fibers being nitrated natural cellulose fibers;
  (b) draining off excess aqueous medium from the slurry to produce a stiff, nonflowing, moist cake of the comminuted irregularly shaped fragments of nitrocellulose fibers; and
  (c) thereafter blending from about 0.5% to about 2% by weight, based on the weight of nitrocellulose, of a hydrophilic protective colloid into the moist cake of comminuted irregularly shaped fragments of nitrocellulose fibers, whereby a smooth, fluid, homogeneous dispersion of the comminuted irregularly shaped fragments of nitrocellulose fibers in the aqueous medium remaining in said moist cake is produced.

16. The process in accordance with claim 3 which comprises
  (a) ball-milling a slurry consisting essentially of nitrocellulose fibers suspended in water until substantially all of said nitrocellulose fibers have been fractured and comminuted into tiny irregularly shaped fragments, a substantial majority of which have a maximum dimension of about 2 microns, the remainder being tiny, irregular, needle-like fragments less than 3 microns in two dimensions but greater than 3 microns in length and tiny irregular platelets less than 3 microns in thickness but greater than 3 microns in diameter, said nitrocellulose fibers being nitrated natural cellulose fibers;
  (b) draining off excess water from the slurry to produce a stiff, nonflowing, moist cake of the comminuted irregularly shaped fragments of nitrocellulose fibers; and
  (c) thereafter blending from about 0.5% to about 2% by weight, based on the weight of nitrocellulose, of a hydrophilic protective colloid into the moist cake of comminuted irregularly shaped fragments of nitrocellulose fibers, whereby a smooth, fluid, homogeneous dispersion of the comminuted irregularly shaped fragments of nitrocellulose fibers in the aqueous medium remaining in said moist cake is produced.

References Cited by the Examiner

UNITED STATES PATENTS

| | | | |
|---|---|---|---|
| 1,848,268 | 3/32 | Persiel | 106—170 |
| 2,722,528 | 11/55 | Johnson | 106—198 |
| 2,843,582 | 7/58 | Voris | 106—170 |
| 2,843,583 | 7/58 | Voris | 106—170 |

ALEXANDER H. BRODMERKEL, *Primary Examiner.*

MORRIS LIEBMAN, *Examiner.*